United States Patent [19]

Lunder et al.

[11] 4,440,796

[45] Apr. 3, 1984

[54] COLD SOLUBLE POWDERED TEA EXTRACTS

[75] Inventors: Tito-Livio Lunder; Corine-Madeleine Nielsen, both of Lausanne, Switzerland

[73] Assignee: Societe d'Assistance Technique pour Produits Nestle S.A., Lausanne, Switzerland

[21] Appl. No.: 396,895

[22] Filed: Jul. 9, 1982

[51] Int. Cl.³ .............................................. A23F 3/30
[52] U.S. Cl. ................................................. 426/597
[58] Field of Search ........................................ 426/597

[56] References Cited

U.S. PATENT DOCUMENTS 2,891,865  6/1959  Seltzer et al. ..................... 426/435
3,531,296  9/1970  Smithies ............................ 426/597
4,015,023  3/1977  Lamberti et al. ............... 426/597 X

*Primary Examiner*—Joseph M. Golian
*Attorney, Agent, or Firm*—Vogt & O'Donnell

[57] ABSTRACT

A process for the production of a cold soluble powdered tea extract wherein a hot soluble powdered tea extract is treated with a mixture of from 25% to 65% by weight of a carboxylic acid and from 15% to 65% by weight of a carboxylic acid salt based on the weight of the hot soluble powdered tea extract and ground to the desired particle size.

9 Claims, No Drawings

COLD SOLUBLE POWDERED TEA EXTRACTS

The present invention relates to the production of a cold-soluble powdered tea extract.

The traditional methods of producing instant tea, which usually consist of the steps of extraction, aroma processing, dehazing and drying, do not give cold soluble powders. The achievement of cold-water solubility necessitates some additional processing of the extracted tea which contains a considerable amount of cold-water insoluble material formed by tea cream and polymers of polyphenols. This additional processing involves the solubilisation of the tea cream by chemicals or enzymes which is both time and energy consuming. We have now found that a cold soluble tea powder may be prepared by a very simple treatment of traditional hot soluble powdered tea extract with a carboxylic acid and salt thereof, wherein a tea cream solubilisation step is unnecessary, thus economising on both time and energy.

In this invention "hot soluble powdered tea extract" means a powdered tea extract prepared by traditional methods which is soluble in hot water but not in cold water; it is also to be understood that the carboxylic acids and the carboxylic acid salts are food-grade.

According to the present invention there is provided a process for the production of a cold soluble powdered tea extract characterised in that a hot soluble powdered tea extract is treated with a mixture of from 25% to 65% by weight of a carboxylic acid and from 15% to 65% by weight of a carboxylic acid salt based on the weight of the hot soluble powdered tea extract and ground to the desired particle size.

This invention is applicable to all kinds of black teas and their blends, caffeine bearing tea-like leaves such as the varieties of Maté and their blends, as well as herbal teas. In this invention the word "tea" is intended to cover all the aforementioned plant materials.

The carboxylic acid is advantageously an aliphatic di- or tri-carboxylic acid, for example malic acid or succinic acid, but preferably citric acid or tartaric acid. The amount of carboxylic acid that is used is conveniently from 30% to 60% by weight and preferably from 35% to 55% by weight based on the weight of the hot soluble powdered tea extract.

The salt of the carboxylic acid is preferably an alkali metal or an alkaline earth metal salt, for example sodium citrate or calcium citrate. The amount of salt used is conveniently from 20% to 60% by weight and preferably from 25% to 55% by weight based on the weight of the hot soluble powdered tea extract.

The proportion of the carboxylic acid to the carboxylic acid salt is conveniently from 0.5 to 2.5 parts by weight and preferably from 0.75 to 2.25 parts by weight of acid per part by weight of the salt.

If desired, ascorbic acid may be added to the mixture. The amount of ascorbic acid may conveniently be up to 5% by weight and preferably from 0.5% to 3% by weight based on the weight of the hot soluble powdered tea extract.

In addition, inorganic salts of the alkali and alkaline earth metals may be added to the mixture, for example, calcium carbonate or sodium bicarbonate. The amount of these inorganic salts used may be from 10% to 25% by weight and preferably from 12% to 20% by weight based on the weight of the hot-soluble powdered tea extract.

In carrying out the process of the invention, firstly the mixture of ingredients is conveniently wetted for instance with water, advantageously deionised water, to form a paste which is preferably homogeneous. Desirably a wetting aid is added to the mixture, suitably before wetting, so that a homogeneous paste is obtained when the mixture is wetted. A suitable wetting aid is a sugar such as fructose, glucose or sucrose and the amount of wetting aid used is conveniently from 10 to 60 parts by weight and preferably from 20 to 50 parts by weight per part by weight of the hot soluble powdered tea extract.

The paste is then conveniently dried at a temperature up to 75° C. and preferably from 50° C. to 70° C. In order to aid the drying, the paste is preferably extruded or cut into small pieces, for example in a mincer, before being dried. When extruded, the paste is conveniently forced through a sieve whose meshes have a diameter from 1 mm to 4 mm and preferably from 1.5 mm to 3 mm.

Finally the dried mixture is ground, preferably to an average particle size of up to 2.5 mm diameter depending upon the requirements, such as the free flowing properties. For example, average particle sizes of from 0.25 mm to 2.25 mm are satisfactory. By the process of this invention cold soluble teas may be produced which are suitable for use both in the home and in vending machines.

The following Examples further illustrate the present invention.

EXAMPLE 1

2 g hot soluble tea extract were mixed with 1 g sodium citrate, 1 g citric acid and 96 g sucrose. The mixture was wetted with 10 ml water to form a homogeneous paste which was extruded through a sieve whose meshes each had a diameter of 2 mm and then dried in a vacuum oven at 60° C. for the time necessary to eliminate the water. Finally the dry mixture was ground to give a cold-soluble tea powder with particles having an average diameter of 1 mm.

EXAMPLE 2

2.4 g hot soluble tea extract were mixed with 1 g citric acid, 0.3 g calcium carbonate, 0.6 g sodium citrate, 0.5 g sodium bicarbonate and 95.2 g sucrose. The mixture was then treated in exactly the same way as in Example 1 except that the dried mixture was ground to give a cold soluble tea powder with particles having an average diameter of 0.5 mm.

EXAMPLE 3

2.4 g hot soluble tea extract were mixed with 1 g citric acid, 0.6 g sodium citrate, 0.5 g sodium bicarbonate and 95.2 g sucrose. The mixture was then treated in exactly the same way as in Example 1 except that the dried mixture was ground to give a cold soluble tea powder with particles having an average diameter of 2 mm.

We claim:

1. A process for the production of a cold soluble powdered tea extract which comprises treating a hot soluble powdered tea extract with a mixture of from 25% to 65% by weight of an aliphatic di- or tri-carboxylic acid and from 15% to 65% by weight of an aliphatic di- or tri-carboxylic acid salt based on the weight of the hot soluble powdered tea extract and grinding the resultant mixture to the desired particle size.

2. The process of claim 1, wherein the carboxylic acid is citric acid.

3. The process of claim 1, wherein the amount of carboxylic acid used is from 35% to 55% by weight based on the weight of the hot soluble powdered tea extract.

4. The process of claim 1, wherein the amount of carboxylic acid salt used is from 25% to 55% by weight based on the weight of the hot soluble powdered tea extract.

5. The process of claim 1, wherein the proportion of the carboxylic acid to the carboxylic acid salt is from 0.5 to 2.5 parts by weight of acid per part by weight of salt.

6. The process of claim 1, wherein the mixture of ingredients, together with a wetting aid in an amount from 10 to 60 parts by weight per part by weight of the hot soluble powdered tea extract, is wetted with deionised water to form a homogeneous paste which is then dried and ground to the desired particle size.

7. The process of claim 6, wherein the wetting aid is sucrose, fructose or glucose.

8. The process of claim 6, wherein before being dried, the paste is extruded through a sieve whose meshes each have a diameter of from 1.5 mm to 3.0 mm.

9. The process of claim 6, wherein the paste is dried at a temperature of from 50° C. to 70° C.

* * * * *